United States Patent
Johansson et al.

(10) Patent No.: US 6,947,394 B1
(45) Date of Patent: Sep. 20, 2005

(54) FLEXIBLE RADIO LINK CONTROL PROTOCOL

(75) Inventors: Mathias Johansson, Sollentuna (SE); Per Beming, Stockholm (SE); Christiaan Roobol, Hässelby (SE); Bela Rathonyi, Malmö (SE); Joachim Sachs, Aachen (DE); Michael Meyer, Aachen (DE); Roger Kalden, Neuss (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/544,826

(22) Filed: Apr. 6, 2000

Related U.S. Application Data

(60) Provisional application No. 60/128,663, filed on Apr. 9, 1999.

(51) Int. Cl.[7] .............................................. H04B 1/44
(52) U.S. Cl. ...................... 370/282; 370/252; 370/449; 709/225; 709/235
(58) Field of Search .......................... 370/282, 395.53, 370/449, 450, 451, 454, 456, 252, 465, 468; 709/225, 235, 250

(56) References Cited

U.S. PATENT DOCUMENTS

| | | | | |
|---|---|---|---|---|
| 4,667,193 A | * | 5/1987 | Cotie et al. | 340/825.08 |
| 4,736,371 A | * | 4/1988 | Tejima et al. | 370/95 |
| 4,940,974 A | * | 7/1990 | Sojka | 340/825.08 |
| 5,247,623 A | * | 9/1993 | Sun | 395/325 |
| 5,274,838 A | | 12/1993 | Childress et al. | 455/9 |
| 5,487,072 A | | 1/1996 | Kant | 371/32 |
| 5,701,298 A | * | 12/1997 | Diachina et al. | 370/346 |
| 5,757,924 A | * | 5/1998 | Friedman et al. | 713/151 |
| 5,847,751 A | * | 12/1998 | Safadi | 348/7 |
| 6,308,214 B1 | * | 10/2001 | Plevyak et al. | 709/233 |
| 6,625,133 B1 | * | 9/2003 | Balachandran et al. | 370/329 |

FOREIGN PATENT DOCUMENTS

WO　　WO 95/12935　　5/1995　　............ H04J 3/16

OTHER PUBLICATIONS

William Stallings; *Data Link Control*; Data and Computer Communications, Prentice Hall International Editions; 1994, Fourth Edition; pp. 170-187.
ISR for PCT 00/00675; Completed on Sep. 15, 2000.

* cited by examiner

*Primary Examiner*—Shick Hom

(57) ABSTRACT

A flexible Radio Link Control (RLC) protocol for a mobile communication system is provided, whereby a plurality of different RLC functions are defined. These different RLC functions can be combined in a number of different ways to produce a complete and functional, but more flexible RLC protocol than the existing protocol. For example, a new set of rules are provided for determining how and/or when to poll for, or send, a status report for Automatic Repeat Request (ARQ) purposes. As such, for a specific service configuration, one set of the rules can be used, and for a different service configuration, another set of the rules can be used. In this way, the rules can be conformed suitably to the type of service involved.

37 Claims, 1 Drawing Sheet

FLEXIBLE RADIO LINK CONTROL PROTOCOL

CROSS-REFERENCES TO RELATED APPLICATIONS

This application for patent claims the benefit of priority from, and hereby incorporates by reference the entire disclosure of, co-pending U.S. Provisional Application Patent Ser. No. 60/128,663, filed Apr. 9, 1999.

BACKGROUND OF THE INVENTION

1. Technical Field of the Invention

The present invention relates in general to the telecommunications field and, in particular, to a flexible Radio Link Control (RLC) protocol for a mobile communications system.

2. Description of Related Art

When data is conveyed between nodes in a telecommunication network, certain algorithms are used to recover from the transmission of erroneous data and the loss of data on the transmission links between the nodes. An algorithm commonly used to recover from the transmission of erroneous data is referred to as an Automatic Repeat Request (ARQ) protocol.

The existing ARQ protocols include two peer entities that communicate with each other over transmission links. Each such entity includes a receiver and a sender. The units of data conveyed between the peer entities are commonly referred to as Protocol Data Units (PDUs). The ARQ protocols include certain rules for sending and receiving PDUs, as well as rules for the structure of the PDUs.

The receiver can inform the sender about which PDUs were correctly received (i.e., receiver acknowledges correctly-received PDUs) and/or which PDUs were incorrectly received. When the sender receives this information, it retransmits the "lost" PDUs. In other words, an ARQ protocol is a set of rules that allow the use of efficient retransmission mechanisms between a sending side and receiving side in a communication system. These rules specify, for example, how and in what form the PDUs are to be constructed so that the receiving side can interpret the conveyed PDUs correctly and respond to them accordingly.

Three main types of information elements (PDUs) can be transferred between two ARQ peer entities: user data; error recovery control data; and common control data. These three types of PDUs can be found in all existing ARQ protocols. A user data PDU contains at least user data and a sequence number. An error recovery control data PDU contains various amounts of control information needed for error recovery, and control functions such as positive and negative acknowledgments. A common control data PDU contains common control data. Notably, PDUs that include user data and at least a sequence number are denoted herein as Data-PDUs (D-PDUs), and PDUs that include control data needed for error control/recovery are denoted herein as Status-PDUs (S-PDUs).

In the known High Level Data Link Control (HDLC) protocol, which forms the basis for many existing ARQ protocols, the three types of PDUs are called, respectively, information frames (I-frames), supervisory frames (S-frames), and unnumbered frames (U-frames). The RLC protocol used in the existing General Packet Radio Service (GPRS) and the so-called 3rd Generation Cellular Communication System is an example of an HDLC-derived ARQ protocol.

In most communication systems, user data information is conveyed in both directions between the peer entities. A common feature included in an ARQ protocol is that is possible to include error control information in user data PDUs. This capability is known as "piggybacking". For example, an acknowledgment is included in all I-frames (i.e., D-PDUs) of HDLC-derived protocols. The acknowledgment informs the peer entity about the sequence number of the last (in-sequence) correctly received PDU.

The 3rd Generation Partnership Project (3GPP™) has produced an RLC Protocol Specification for the Radio Access Network (RAN) in the so-called 3rd Generation Digital Cellular Telecommunications System. This system is also known as the Universal Mobile Telecommunication System (UMTS), the UMTS Terrestrial Radio Access (UTRA) system, and the International Mobile Telecommunications-2000 (IMT-2000) system. As such, in accordance with the RLC Protocol Specification for the $3^{rd}$ Generation System, the RLC sublayer provides three, different data transfer service modes (modes for services that the RLC layer provides to the higher layers): (1) transparent data transfer; (2) unacknowledged data transfer; and (3) acknowledged data transfer. The transparent data transfer service transmits higher layer PDUs to a peer entity without adding any protocol information to these PDUs. The unacknowledged data transfer service transmits higher layer PDUs to a peer entity, but without guaranteeing delivery to the peer entity involved.

The acknowledged data transfer service provided by the RLC Protocol transmits higher layer PDUs to a peer entity with guaranteed delivery. If the RLC sublayer is unable to deliver such data correctly (e.g., error-free delivery), the RLC user at the transmitting side is so notified, and that data is retransmitted. As such, in accordance with the RLC protocol, the acknowledged data transfer mode provides error-free delivery (ensured by retransmission). In other words, the receiving RLC peer entity delivers only error-free SDUs to the higher layer. The acknowledged data transfer mode also provides unique delivery (the RLC sublayer delivers an SDU only once to the receiving upper layer), and in-sequence and out-of-sequence delivery (the RLC sublayer delivers SDUs to the receiving higher layer entity either in the same order or in a different order than what the transmitting higher layer entity submits to the RLC sublayer).

A significant problem with the existing RLC protocol is that only one protocol configuration is specified. Consequently, this protocol is not readily adaptable to the relatively large number of different service situations that can occur in existing and future multi-service systems. However, as described in detail below, the present invention successfully resolves this problem and other related problems.

SUMMARY OF THE INVENTION

In accordance with a preferred embodiment of the present invention, a flexible RLC protocol for a mobile communication system is provided, whereby a plurality of different RLC functions are defined. These different RLC functions can be combined in a number of different ways to produce a complete and functional, but more flexible RLC protocol than the existing protocol. For example, a new set of rules are provided for determining how and/or when to poll for, or send, a status report for ARQ purposes. As such, for a specific service configuration, one set of the rules can be used, and for a different service configuration, another set of the rules can be used. In this way, the rules can be conformed suitably to the type of service involved. For example, it may be preferable to use periodic polling for one type of service, and no polling for another type of service. The present invention's protocol allows flexible configuration on a per service basis.

An important technical advantage of the present invention is that a flexible RLC protocol is provided, which can readily adapt to the multitude of different service situations that can occur in a multi-service communication system.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
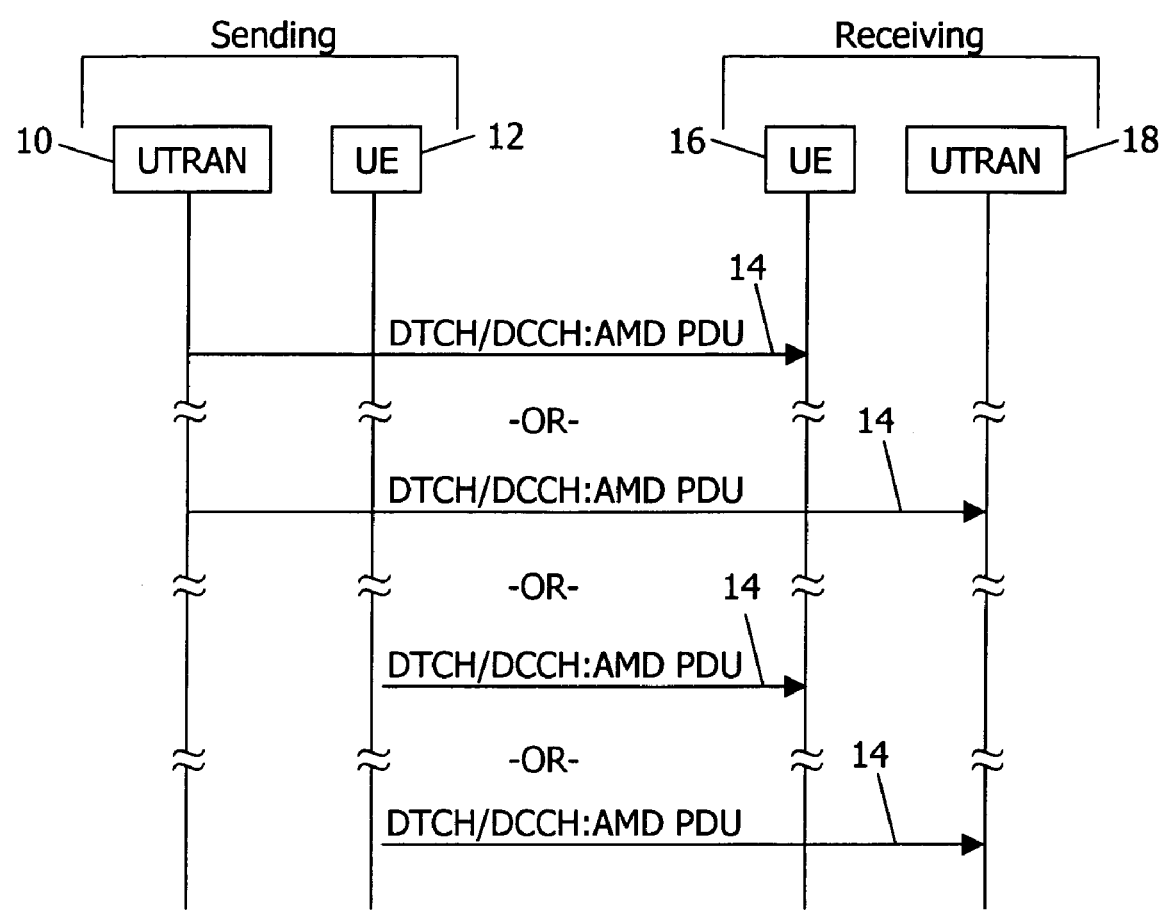
FIG. 1 is a diagram that illustrates an acknowledged mode data transfer method for an RLC protocol, which can be used to implement the preferred embodiment of the present invention.

The preferred embodiment of the present invention and its advantages are best understood by referring to FIG. 1 of the drawings, like numerals being used for like and corresponding parts of the various drawings.

Essentially, in accordance with a preferred embodiment of the present invention, a flexible RLC protocol for a mobile communication system is provided, whereby a plurality of different RLC functions are defined. These different RLC functions can be combined in a number of different ways to produce a complete and functional, but more flexible RLC protocol than the existing protocol. For example, a new set of rules are provided for determining how and/or when to poll for, or send, a status report for ARQ purposes. As such, for a specific service configuration, one set of the rules can be used, and for a different service configuration, another set of the rules can be used. In this way, the rules can be conformed suitably to the type of service involved. For example, it may be preferable to use periodic polling for one type of service, and no polling for another type of service. The present invention's protocol allows flexible configuration on a per service basis.

Specifically, FIG. 1 is a diagram that illustrates an acknowledged mode data transfer method, which can be used to implement the preferred embodiment of the present invention. Although an acknowledged mode data transfer method is shown, the present invention is not intended to be so limited and can include other data transfer methods or other data retransmission protocols. As shown, the acknowledged mode data transfer method can be used for transferring data between two peer entities which are operating in the acknowledged mode. In accordance with the existing RLC protocol, this method can be initiated by either the User Equipment (UE) or the UTRA Network (UTRAN). As such, the sender in the UE 12 or UTRAN 10 sends one or more Acknowledged Mode Data PDUs (AMD PDUs) 14 to the receiver in the UTRAN 18 or UE 16. An AMD PDU is used to convey sequentially-numbered PDUs containing RLC SDU data. The AMD PDU is used by the RLC when it is operating in the acknowledged mode. An AMD PDU includes a segment of one or more SDUs, a DIC field (indicating a D-PDU), a sequence number, a polling bit, a header extension bit, and one or more length indicator fields.

For this exemplary embodiment, the RLC functions are divided into two groups: transmitting (sending) side functions; and receiving side functions. All such functions can be implemented by the UE (e.g., mobile station) or the UTRAN. A transmitting or receiving RLC function can be mandatory or optional to use for each acknowledged mode entity. If such a function is mandatory, then no explicit signalling (e.g., from the Radio Resource Control (RRC)) is needed to initiate that function.

Referring to the RLC transmitting functions, if a polling mechanism is applied on the transmitting entity side, the following Table (1) illustrates the functions that control when a transmitter can poll a peer entity for a status report. As such, an S-PDU transfer method is used for transferring status information between two RLC peer entities which are operating in the acknowledged mode. The method can be initiated by either the UE or UTRAN.

TABLE 1

| Trigger | Presence |
| --- | --- |
| Last PDU in buffer. | Mandatory |
| Poll timer. | Mandatory |
| Every X PDU. | Optional |
| Every X SDU. | Optional |
| X% of transmission window. | Optional |
| Timer based. | Optional |
| $T_{prohibit}$ | Optional |

Table 1 illustrates the functions that can trigger when a transmitter polls the receiver for a status report. One such trigger event is when the last PDU in the transmission buffer is transmitted. As shown in Table 1 for this embodiment, the transmission of the last PDU in the transmitter buffer function is mandatory for the transmit side when polling has been applied.

Another function that can trigger when a transmitter polls the receiver for a status report is by use of a poll timer. The poll timer starts timing when a poll is transmitted to the peer entity. If no status report is received by the transmitting entity before the poll timer has expired, the transmitter sends a new poll to the receiver. The value of the timer is determined by a signal from the RRC. For this embodiment, the poll timer function is mandatory for the transmitting side if polling has been applied.

The transmitting side can also poll the peer entity for a status report every X PDU. The value of X is determined by a signal from the RRC. For this embodiment, this function is optional for the transmitting side. Similarly, the transmitting side can poll the peer entity for a status report every X SDU. Again, the value of X is determined by a signal from the RRC, and this function is optional for the transmitting side.

The transmitting side can also poll the peer entity for a status report when the transmitter has reached X % of the transmission window. The value of X is determined by a signal from the RRC, and this function is optional for the transmitting side.

Another function that can trigger when a transmitter polls the receiver for a status report can be based on the use of a timer. In other words, the transmitting side polls the peer entity periodically for a status report. The value (duration) of the time period is determined by a signal from the RRC. This function is optional for the transmitting side.

A $T_{prohibit}$ function can be used to control how often the transmitting side is allowed to poll the peer entity. The $T_{prohibit}$ timer is started when a poll is transmitted to the peer entity. As such, the transmitting entity is not allowed to poll the peer entity while the $T_{prohibit}$ timer is running. The value (duration) of the timer is determined by a signal from the RRC. This function is optional for the transmitting side.

Table 2 illustrates a list of functions that can control how an entity can react to a received status report, in accordance with the preferred embodiment of the present invention. A function that controls the transmitting side's reaction to a status report is the adjustment or updating of the transmission window according to the information received in the status report. This function is mandatory for the transmitting side.

TABLE 2

| Trigger | Presence |
| --- | --- |
| Adjust transmission window. | Mandatory |
| Retransmit PDUs. | Mandatory |
| Plausibility check. | Optional |

Another function that controls the transmitting side's reaction to the receipt of a status report is the transmitting side's retransmission of the AM PDUs that have been requested by the status report. If a plausibility check function has not been applied, then the requested AM PDUs are retransmitted immediately and with a higher priority than that of the newer AM PDUs. This function is mandatory for the transmitting side.

The above-mentioned plausibility check is another function that can be used to control the reaction of the transmitting side in response to the receipt of a status check. Essentially, a plausibility check determines whether the contents of a status report are reasonable or not. This function can prohibit or delay the retransmissions requested in the status report. For example, the status report can contain negative acknowledgments for PDUs which may not have arrived at the receiver before the status report was transmitted. As such, the transmitter should not retransmit these PDUs. This function is optional for the transmitting side.

In accordance with the preferred embodiment, the RLC functions for the receiving side are now described. Essentially, the receiving side sends a status report to the transmitting entity if the receiving side receives a poll. The status report is transmitted to the transmitting side immediately, except if the Estimated PDU Counter (EPC) is running. The EPC is a counter that is decremented each transmission time interval with the estimated number of PUs that should have been transmitted during that interval. If a receiver detects missing PDUs, the receiver sends an S-PDU to the transmitter and sets the EPC equal to the number of requested PUs. The EPC timer controls the maximum amount of time that the EPC has to wait before it starts counting down. When the EPC count reaches zero and not all requested PUs have been received correctly, a new S-PDU is transmitted and the EPC is reset accordingly. The EPC timer is then restarted. As such, in accordance with the preferred embodiment, if the EPC counter is used and running, the status report is transmitted to the transmitting side when the EPC counter has expired. This function is mandatory for the receiving side.

Table 3 illustrates the functions that can control just when the receiving entity is to transmit a status report to the transmitting side, in accordance with the preferred embodiment of the present invention. One such control function at the receiving side is the receipt of a poll. As such, the receiving side sends a status report to the peer entity upon receipt of a poll. The status report is sent immediately to the transmitting side, except when the EPC counter is running. If the EPC counter is being used and running, the receiving side sends the status report after the EPC counter has expired. This function is mandatory for the receiving side.

TABLE 3

| Trigger | Presence |
| --- | --- |
| Reception of poll. | Mandatory |
| EPC | Optional |
| Detection of missing PDU(s). | Optional |
| Every X SDU. | Optional |
| Every X PDU. | Optional |
| X% of receiving window. | Optional |
| Timer based. | Optional |
| $T_{prohibit}$ | Optional |

For this embodiment, the EPC counter is started when a status report is transmitted to the peer entity. If the EPC counter expires before all of the AM PDUs requested for retransmission have been received at the receiving side, then the transmitting side transmits a new status report to the peer entity. The EPC counter function is optional for the receiving side.

Another function that controls just when the receiving side is to send a status report to the transmitting side is the detection of missing AM PDUs. If the receiving side detects missing AM PDUs, the receiving side transmits the status report immediately, except when the EPC counter is running. If the EPC counter is in use and has been running, the receiving side transmits the status report to the transmitting side after the EPC counter has expired. This function is optional for the receiving side.

The receiving side can also send a status report to its peer entity every X SDU. The value of X is determined by a signal from the RRC. For this embodiment, this function is optional for the transmitting side. Similarly, the receiving side can send a status report to the peer entity every X PDU. Again, the value of X is determined by a signal from the RRC, and this function is optional for the receiving side.

The receiving side can also send a status report to its peer entity when X % of the transmission window has been reached. The value of X is determined by a signal from the RRC, and this function is optional for the receiving side.

Another function that can control just when the receiving side sends a status report to its peer entity can be based on the use of a timer. In other words, the receiving side sends the status report periodically to the peer entity. The value (duration) of the time period is determined by a signal from the RRC. This function is optional for the receiving side.

A $T_{prohibit}$ function can also be used to control how often the receiving side is allowed to send a status report to the peer entity. The $T_{prohibit}$ function is started when a status report is transmitted to the peer entity. As such, the receiving side is not allowed to send status reports to the peer entity while the $T_{prohibit}$ timer is running. The value of the timer is determined by a signal from the RRC. This function is optional for the receiving side.

In accordance with the preferred embodiment, different combinations of the above-described RLC functions can be used to satisfy retransmission requirements for an ARQ protocol in a more flexible manner than that achieved by the existing protocol. For example, in order to achieve the retransmission scheme set forth in the existing RLC Protocol in a more flexible manner, the following (e.g., acknowledged mode) settings can be signalled by the RRC: (1) Polling should be used; (2) Poll the peer entity every SDU (X=1);

(3) $T_{prohibit}$ should be used on the transmitting side; and (4) A status report is transmitted immediately upon detection of one or more missing PDU(s). In addition, the following functions are provided implicitly because they are mandatory: (1) Poll when the last PDU in the transmitter buffer has been transmitted; (2) Poll timer should be used; (3) The transmitting side adjusts the transmission window in accordance with the received status reports; (4) The transmitting side retransmits AM PDUs in accordance with the received status reports; and (5) The receiving side replies immediately with a status report upon receiving a poll.

Also in accordance with the preferred embodiment, the following is another example that illustrates how the above-described RLC functions can be used to satisfy retransmission requirements for an ARQ protocol in a more flexible manner than that achieved by the existing protocol. In order to achieve the retransmission scheme using the EPC counter mechanism in a more flexible manner, the following (e.g., acknowledged mode) settings can be signalled by the RRC: (1) Polling should be used; (2) Poll when the transmitting side has reached X % of the transmission window; (3) The receiving side should use the EPC counter mechanism; and (4) The status report is transmitted immediately upon detection of missing PDU(s), except when the EPC counter is running. In addition, the following functions are provided implicitly because they are mandatory: (1) Poll when the last PDU in the transmitter buffer has been transmitted; (2) Poll timer should be used; (3) The transmitting side adjusts the transmission window in accordance with the received status reports; (4) The transmitting side retransmits AM PDUs in accordance with the received status reports; and (5) The receiving side replies immediately with a status report upon receiving a poll, except when the EPC counter is running.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a communication system, a method of implementing a flexible link-layer protocol that enables transmission of date between a link-layer transmitting peer entity and a link-layer receiving peer entity, wherein the transmitting peer entity transmits a plurality of packet data units (PDUs) to the receiving peer entity, said method comprising the steps of:

determining by the transmitting peer entity, a first configurable set of rules governing whether the transmitting peer entity should send polling requests to the receiving peer entity, and if so, how and/or how often the polling requests should be sent;

upon determining that the transmitting peer entity should send polling requests to the receiving peer entity, sending polling requests from the transmitting peer entity to the receiving peer entity in accordance with the first configurable set of rules;

determining by the receiving peer entity, a second configurable set of rules governing whether the receiving peer entity should send status reports to the transmitting peer entity in response to receiving one or more polling requests, and if so, how and/or how often the status reports should be sent; and upon determining that the receiving peer entity should send status reports to the transmitting peer entity, sending status reports from the receiving peer entity to the transmitting peer entity in accordance with the second configurable set of rules;

wherein the first and second sets of rules are configurable and combinable to change whether the transmitting peer entity should send polling requests, and if so, how and/or how often the transmitting peer entity should send the polling requests, and whether the receiving peer entity should send status reports, and if so, how and/or how often the receiving peer entity should send the status reports.

2. The method of claim 1, wherein the first set of rules causes the transmitting peer entity to send the polling request when a last Protocol Data Unit (PDU) in a transmission buffer is transmitted.

3. The method of claim 1, wherein the first set of rules causes the transmitting peer entity to send the polling request when the status report has not been received by the transmitting peer entity and a polling timer has timed out.

4. The method of claim 1, wherein the first set of rules causes the transmitting peer entity to send the polling request when the transmitting peer entity has transmitted a predefined number of Protocol Data Units (PDUs).

5. The method of claim 1, wherein the first set of rules causes the transmitting peer entity to send the polling request when the transmitting peer entity has transmitted a predefined number of Service Data Units (SDUs).

6. The method of claim 1, wherein the first set of rules causes the transmitting peer entity to send the polling request when the transmitting peer entity has transmitted during a predefined portion of a transmitting window.

7. The method of claim 1, wherein the first set of rules causes the transmitting peer entity to send the polling request when these transmitting peer entity has transmitted during a predefined period of time.

8. The method of claim 1, wherein the first set of rules causes the transmitting peer entity to defer sending the polling request for a predefined period of time.

9. The method of claim 1, further comprising adjusting by the transmitting peer entity, a transmission window parameter in response to receiving the status report.

10. The method of claim 1, further comprising retransmitting by the transmitting peer entity, at least one Protocol Data Unit (PDU) responsive to receiving said status report.

11. The method of claim 1, further comprising the steps of:

determining by the transmitting peer entity whether the status report sent by the receiving peer entity is plausible; and retransmitting by the transmitting peer entity, at least one Protocol Data Unit (PDU) in response to determining that the status report is plausible.

12. The method of claim 1, wherein the second set of rules causes the receiving peer entity to transmit the status report to the transmitting peer entity if an estimated Protocol Data Unit (PDU) counter is not counting, and causes the receiving peer entity to not send the status report to the transmitting peer entity if the estimated PDU counter is counting.

13. The method of claim 1, wherein the second set of rules causes the receiving peer entity to transmit the status report to the transmitting peer entity, if the receiving peer entity detects at least one missing or incorrectly received Protocol Data Unit (PDU).

14. The method of claim 1, wherein the second set of rules causes the receiving peer entity to transmit the status report to the transmitting peer entity when a predefined number of Protocol Data Units (PDUs) is received.

15. The method of claim 1, wherein the second set of rules causes the receiving peer entity to transmit the status report to the transmitting peer entity when a predefined number of Service Data Units (SDUs) is received.

16. The method of claim 1, wherein the second set of rules causes the receiving peer entity to transmit the status report to the transmitting peer entity in response to receiving the polling request.

17. The method of claim 1, wherein the second set of rules causes the receiving peer entity to transmit the status report to the transmitting peer entity when the transmitting peer entity has transmitted during a predefined portion of a transmitting window.

18. The method of claim 1, wherein the second set of rules causes the receiving peer entity to send the status report to the transmitting peer entity during a predefined period of time.

19. The method of claim 1, wherein the second set of rules causes the receiving peer entity to defer sending the status report for a predefined period of time.

20. In a communication network, a system for implementing a flexible link-layer protocol that enables transmission of data between a link-layer transmitting peer entity and a link-layer receiving peer entity, wherein the transmitting peer entity transmits a plurality of packet data units (PDUs) to the receiving peer entity, said system comprising:
  means within the transmitting peer entity for selecting a first configurable set of rules governing whether the transmitting peer entity should send polling requests to the receiving peer entity, and if so, how and/or how often the polling requests should be sent;
  signaling means in the transmitting peer entity for sending polling requests from the transmitting peer entity to the receiving peer entity in accordance with the first set of rules;
  means within the receiving peer entity for selecting a second configurable set of rules governing whether the receiving peer entity should send status reports to the transmitting peer entity in response to receiving one or more polling requests, and if so, how and/or how often the status reports should be sent; and
  signaling means in the receiving peer entity for sending a status report from the receiving peer entity to the transmitting peer entity in accordance with the second set of rules;
  wherein the first and second sets of rules are configurable and combinable to change whether the transmitting peer entity should send polling requests, and if so, how and/or how often the transmitting peer entity should send the polling requests, and whether the receiving peer entity should send status reports, and if so, how and/or how often the receiving peer entity should send the status reports.

21. The system of claim 20, wherein the signaling means in the transmitting peer entity sends the polling request when a last Protocol Data Unit (PDU) in a transmission buffer is transmitted.

22. The system of claim 20, wherein the signaling means in the transmitting peer entity sends the polling request when the status report has not been received by the transmitting peer entity and a polling timer has timed out.

23. The system of claim 20, wherein the signaling means in the transmitting peer entity sends the polling request when the transmitting peer entity has transmitted a predefined number of Protocol Data Units (PDUs).

24. The system of claim 20, wherein the signaling means in the transmitting peer entity sends the polling request when the transmitting peer entity has transmitted a predefined number of Service Data Units (SDUs).

25. The system of claim 20, wherein the signaling means in the transmitting peer entity sends the polling request when the transmitting peer entity has transmitted during a predefined portion of a transmitting window.

26. The system of claim 20, wherein the signaling means in the transmitting peer entity sends the polling request when the transmitting peer entity has transmitted during a predefined period of time.

27. The system of claim 20, wherein the signaling means in the transmitting peer entity defers sending the polling request for a predefined period of time.

28. The system of claim 20, wherein the transmitting peer entity also includes means for adjusting a transmission window parameter in response to receiving the status report.

29. The system of claim 20, wherein the transmitting peer entity also includes means for retransmitting at least one Protocol Data Unit (PDU) in response to receiving the status report.

30. The system of claim 20, wherein the transmitting peer entity also includes:
  means for determining whether the status report sent by the receiving peer entity is plausible; and
  means for retransmitting at least one Protocol Data Unit (PDU) in response to determining that the status report is plausible.

31. The system of claim 20, wherein the signaling means in the receiving peer entity sends the status report to the transmitting peer entity if an estimated Protocol Data Unit (PDU) counter is not counting, and does not send the status report to the transmitting peer entity if the estimated PDU counter is counting.

32. The system of claim 20, wherein the signaling means in the receiving peer entity sends the status report to the transmitting peer entity if the receiving peer entity detects at least one missing or incorrectly received Protocol Data Unit (PDU).

33. The system of claim 20, wherein the signaling means in the receiving peer entity sends the status report to the transmitting peer entity when a predefined number of Protocol Data Units (PDUs) is received.

34. The system of claim 20, wherein the signaling means in the receiving peer entity sends the status report to the transmitting peer entity when a predefined number of Service Data Units (SDUs) is received.

35. The system of claim 20, wherein the signaling means in the receiving peer entity sends the status report to the transmitting peer entity when the transmitting peer entity has transmitted during a predefined portion of a transmitting window.

36. The system of claim 20, wherein the signaling means in the receiving peer entity sends the status report during a predefined period of time.

37. The system of claim 20, wherein the signaling means in the receiving peer entity defers sending the status report for a predefined period of time.

* * * * *

UNITED STATES PATENT AND TRADEMARK OFFICE
CERTIFICATE OF CORRECTION

| | | |
|---|---|---|
| PATENT NO. | : 6,947,394 B1 | Page 1 of 1 |
| APPLICATION NO. | : 09/544826 | |
| DATED | : September 20, 2005 | |
| INVENTOR(S) | : Johansson et al. | |

It is certified that error appears in the above-identified patent and that said Letters Patent is hereby corrected as shown below:

In Column 3, Line 63, delete "DIC", insert -- D/C --, therefor.

In Column 7, Line 45, in Claim 1, delete "date" and insert -- data --.

Signed and Sealed this

Thirteenth Day of November, 2007

JON W. DUDAS
*Director of the United States Patent and Trademark Office*